US012179516B2

(12) United States Patent
Sahashi et al.

(10) Patent No.: US 12,179,516 B2
(45) Date of Patent: Dec. 31, 2024

(54) TIRE

(71) Applicant: BRIDGESTONE CORPORATION, Tokyo (JP)

(72) Inventors: Kohei Sahashi, Tokyo (JP); Shungo Fujita, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 483 days.

(21) Appl. No.: 17/593,637

(22) PCT Filed: Mar. 18, 2020

(86) PCT No.: PCT/JP2020/012097
§ 371 (c)(1),
(2) Date: Sep. 22, 2021

(87) PCT Pub. No.: WO2020/250534
PCT Pub. Date: Dec. 17, 2020

(65) Prior Publication Data
US 2022/0016935 A1    Jan. 20, 2022

(30) Foreign Application Priority Data

Jun. 11, 2019   (JP) .................................. 2019-108443

(51) Int. Cl.
*B60C 11/117*   (2006.01)
*B60C 11/03*    (2006.01)
(Continued)

(52) U.S. Cl.
CPC ...... *B60C 11/0304* (2013.01); *B60C 11/0318* (2013.01); *B60C 11/032* (2013.01);
(Continued)

(58) Field of Classification Search
CPC ............ B60C 11/0318; B60C 11/0304; B60C 11/032; B60C 11/12; B60C 2011/0353; B60C 19/002
See application file for complete search history.

(56) References Cited

U.S. PATENT DOCUMENTS

2016/0075184 A1 *   3/2016   Kato ................... B60C 11/0327
                                                        152/209.8
2016/0075185 A1     3/2016   Akashi
(Continued)

FOREIGN PATENT DOCUMENTS

CN        204506360 U     7/2015
CN        106132728 A    11/2016
(Continued)

OTHER PUBLICATIONS

Machine translation for Japan 2020-001455 (Year: 2023).*
(Continued)

*Primary Examiner* — Steven D Maki
(74) *Attorney, Agent, or Firm* — Sughrue Mion, PLLC

(57) ABSTRACT

In a tire, a plurality of outer resonators (25) are formed in an outer land portion (28) partitioned by two outer main grooves (21, 22) and arranged in a tire circumferential direction, a plurality of inner resonators (26) are formed in an inner land portion (29) partitioned by two inner main grooves (23, 24) and arranged in the tire circumferential direction, the outer resonator includes a first vertical groove (31) which extend in the tire circumferential direction, and a first branch groove (32) and a second branch groove (33) which have an inner volume smaller than that of the first vertical groove, extend in the tire width direction from both end portions of the first vertical groove in the tire circumferential direction such that the first branch groove and the second branch groove extend in directions opposite to each other, and are respectively opened to the two outer main
(Continued)

grooves, and the inner resonator includes a second vertical groove (36) which extends in the tire circumferential direction, and a third branch groove (37) and a fourth branch groove (38) which have an inner volume smaller than that of the second vertical groove, extend in the tire width direction from the second vertical groove such that the third branch groove and the fourth branch groove extend in directions opposite to each other, and are respectively opened to the two inner main grooves.

20 Claims, 3 Drawing Sheets

(51) Int. Cl.
*B60C 11/12* (2006.01)
*B60C 11/13* (2006.01)
*B60C 19/00* (2006.01)

(52) U.S. Cl.
CPC .......... *B60C 11/12* (2013.01); *B60C 11/1315* (2013.01); *B60C 2011/0353* (2013.01); *B60C 19/002* (2013.01)

(56) References Cited

U.S. PATENT DOCUMENTS

| | | | |
|---|---|---|---|
| 2016/0297250 A1 | 10/2016 | Hayashi | |
| 2017/0008347 A1* | 1/2017 | Akashi | B60C 11/0306 |
| 2017/0203614 A1 | 7/2017 | Kato | |
| 2020/0298628 A1* | 9/2020 | Tomida | B60C 11/0304 |

FOREIGN PATENT DOCUMENTS

| | | | |
|---|---|---|---|
| EP | 3 769 976 A1 | | 1/2021 |
| JP | 6-016106 U | | 3/1994 |
| JP | 06-239110 A | * | 8/1994 |
| JP | 2007-269144 A | * | 10/2007 |
| JP | 2009-001204 A | | 1/2009 |
| JP | 2010-280266 A | | 12/2010 |
| JP | 2014-213742 A | | 11/2014 |
| JP | 2014-213745 A | | 11/2014 |
| JP | 2015-98325 A | | 5/2015 |
| JP | 2015-113040 A | | 6/2015 |
| JP | 2015-168274 A | | 9/2015 |
| JP | 2015-171835 A | | 10/2015 |
| JP | 2016-040156 A | | 3/2016 |
| JP | 2019-1406 A | | 1/2019 |
| JP | 2020-001455 A | * | 1/2020 |
| WO | WO-2019/117091 A1 | * | 6/2019 |

OTHER PUBLICATIONS

Machine translation for Japan 2007-269144 (Year: 2023).*
Machine translation for Japan 06-239110 (Year: 2023).*
International Search Report for PCT/JP2020/012097, dated Jun. 9, 2020.
Search Report dated Aug. 17, 2022 from the China National Intellectual Property Administration in CN Application No. 202080038640.5.
Extended European Search Report issued May 15, 2023 in European Application No. 20821980.8.

* cited by examiner

TIRE

CROSS REFERENCE TO RELATED APPLICATIONS

This application is a National Stage of International Application No. PCT/JP2020/012097 filed Mar. 18, 2020, claiming priority based on Japanese Patent Application No. 2019-108443 filed Jun. 11, 2019, the content of which is incorporated herein by reference.

TECHNICAL FIELD

The present invention relates to a tire.

BACKGROUND ART

A tire disclosed in, for example, Patent Document 1 below, in which a plurality of main grooves continuously extending in a tire circumferential direction and resonators disposed between the main grooves adjacent to each other in a tire width direction are formed in a tread surface portion is known in the related art. In this tire, during traveling, occurrence of air column resonance can be suppressed by introducing a portion of air flowing between the main grooves and a road surface into the resonators.

CITATION LIST

Patent Document

[Patent Document 1]
Japanese Unexamined Patent Application, First Publication No. 2015-171835

SUMMARY OF INVENTION

Technical Problem

In the tire of the related art, for example, in the case of a vehicle having a relatively high vehicle height such as an SUV, when the vehicle is turned, a large contact pressure is applied to a tread surface portion of a tire located on a turning outer side among tires of front wheels, particularly to an outer tread surface portion of the tread surface portion located on an outer side of a vehicle with respect to a tire equator, and thus, there is a possibility that it may be difficult to ensure steering stability during the turning.

The present invention is made in view of the above circumstances, and an object thereof is to provide a tire capable of improving steering stability during turning.

Solution to Problem

According to an aspect of the present invention, a tire includes a tread portion which is located at an outer end portion in a tire radial direction and includes a tread surface portion facing an outer side in the tire radial direction, in which two outer main grooves extending continuously in a tire circumferential direction are formed in an outer tread surface portion of the tread surface portion located on an outer side of a vehicle in a tire width direction with respect to a tire equator, two inner main grooves extending continuously in the tire circumferential direction are formed in an inner tread surface portion of the tread surface portion located on an inner side of the vehicle in the tire width direction with respect to the tire equator, a central land portion partitioned by the outer main groove and the inner main groove adjacent to each other in the tire width direction extends continuously in the tire circumferential direction, a plurality of outer resonators are formed in an outer land portion, which is partitioned by the two outer main grooves, and arranged in the tire circumferential direction, and a plurality of inner resonators are formed in an inner land portion, which is partitioned by the two inner main grooves, and arranged in the tire circumferential direction, the outer resonator includes a first vertical groove which extends in the tire circumferential direction, and a first branch groove and a second branch groove which have an inner volume smaller than that of the first vertical groove, extend in the tire width direction from both end portions of the first vertical groove in the tire circumferential direction such that the first branch groove and the second branch groove extend in directions opposite to each other, and are respectively opened to the two outer main grooves, and the inner resonator includes a second vertical groove which extends in the tire circumferential direction, and a third branch groove and a fourth branch groove which have an inner volume smaller than that of the second vertical groove, extend in the tire width direction from the second vertical groove such that the third branch groove and the fourth branch groove extend in directions opposite to each other, and are respectively opened to the two inner main grooves.

Advantageous Effects of Invention

According to the present invention, it is possible to improve steering stability during turning.

DESCRIPTION OF EMBODIMENTS

Figure 1:
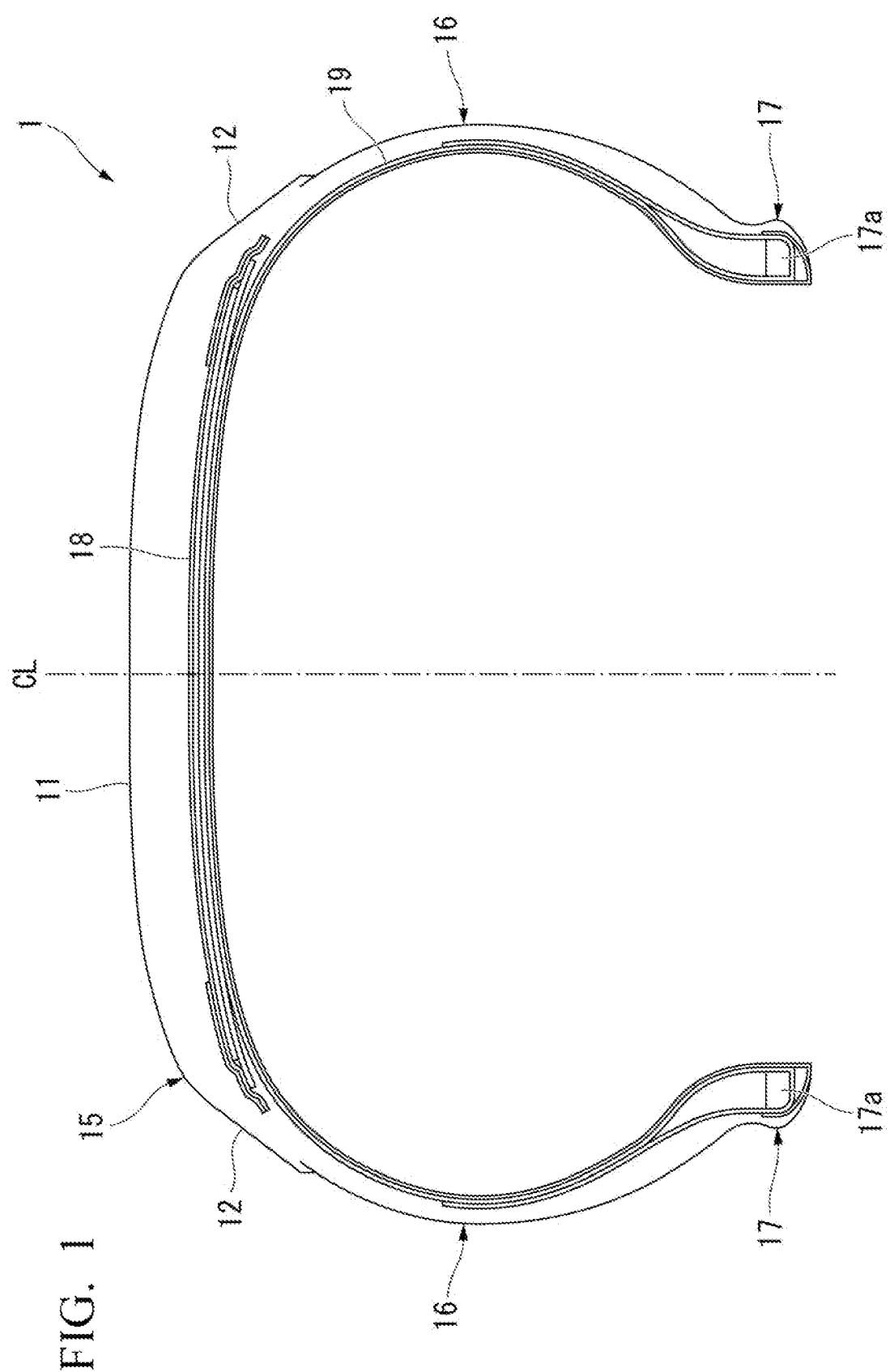
FIG. 1 is a cross-sectional view taken in a tire width direction of a tire according to an embodiment of the present invention.
Figure 2:
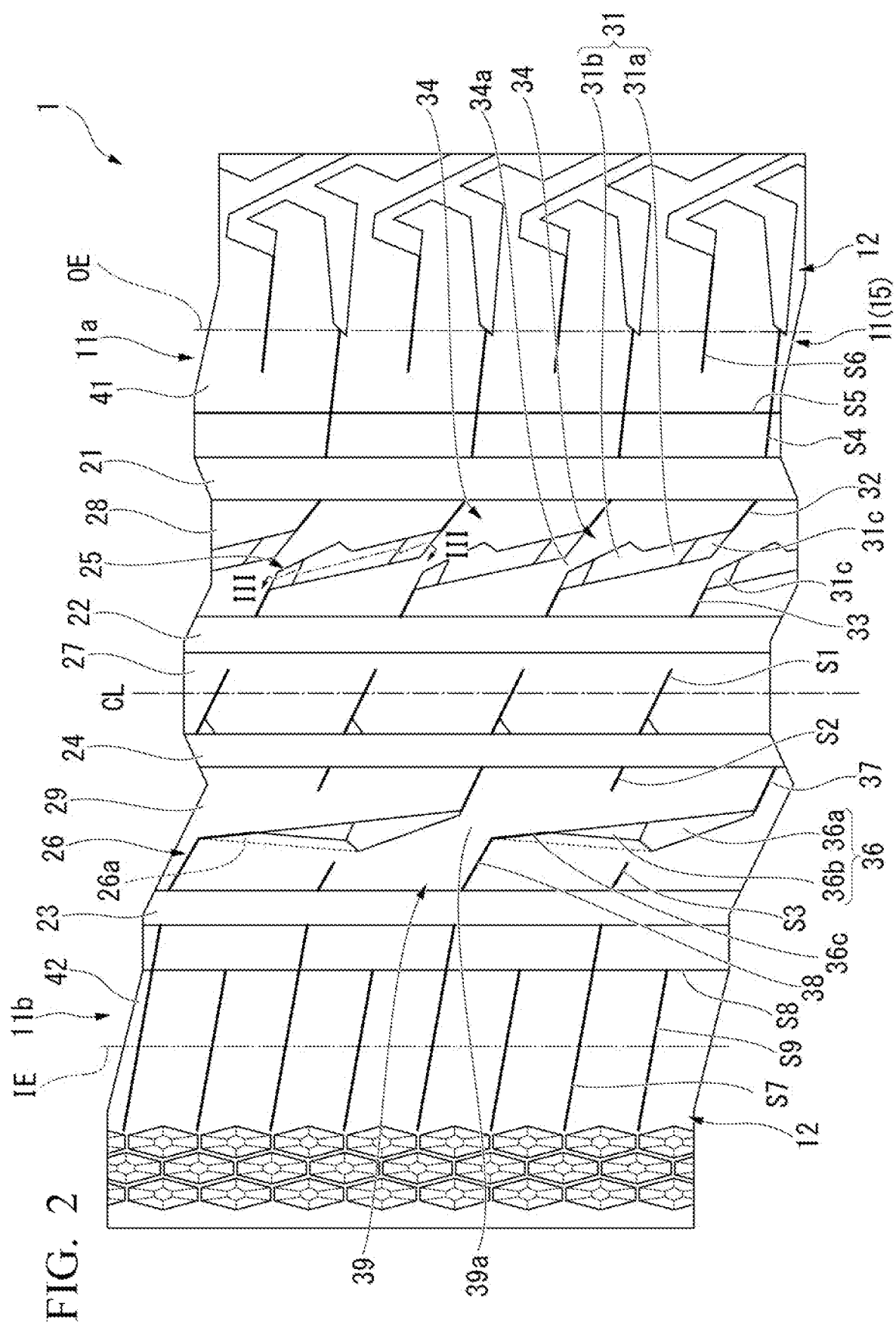
FIG. 2 is a developed view of a tread surface portion and a buttress portion of the tire shown in FIG. 1.
Figure 3:
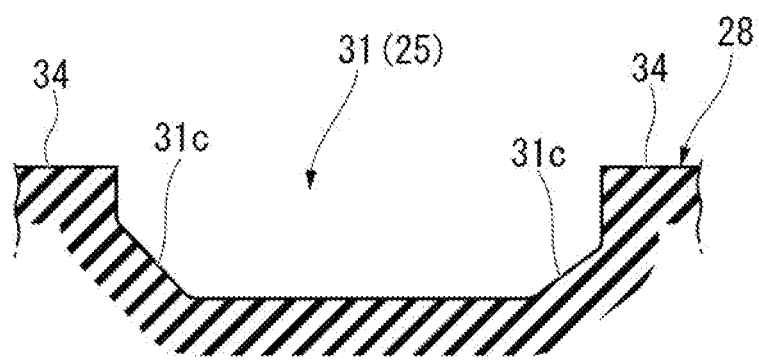
FIG. 3 is a cross-sectional view taken along line of the tire shown in FIG. 2.

Hereinafter, a tire 1 according to an embodiment of the present invention will be described with reference to FIGS. 1 to 3.

The tire 1 includes a tread portion 15 located at an outer end portion in a tire radial direction, a pair of sidewall portions 16 extending inward in the tire radial direction from both end portions of the tread portion 15 in a tire width direction, a pair of buttress portions 12 that connects the tread portion 15 and the sidewall portions 16 to each other, respectively, and bead portions 17 connected to inner end portions of the sidewall portions 16 in the tire radial direction. A bead core 17a is embedded in each bead portion 17. A belt 18 is embedded in the tread portion 15. An outer peripheral surface of the tread portion 15 facing the outer side in the tire radial direction is a tread surface portion 11. A carcass ply 19 is integrally embedded in the tread portion 15, the buttress portions 12, the sidewall portions 16, and the bead portions 17.

The carcass ply 19 is folded back around the bead cores 17a.

An indicator portion (not shown) is formed on an outer surface of the tire 1 so that a mounting direction of the tire 1 in the tire width direction with respect to the vehicle can be specified. This indicator portion is formed on an outer surface of, for example, the sidewall portion 16 of the tire 1.

Here, the tread surface portion 11 refers to a ground contact surface of the tread portion 15 in a state where a regular internal pressure and a regular load are applied to the tire 1. An outer surface of the buttress portion 12 is connected to an outer end portion of the tread surface portion 11 in the tire width direction, and the buttress portion 12 does not come into contact with a smooth road surface when the tire 1 is rotated in a state where the regular internal pressure and regular load are applied to the tire 1.

The regular internal pressure is an air pressure corresponding to a maximum load capacity in Year Book 2008 version of Japan Automobile Tire Association (JATMA), and the regular load is a load corresponding to a maximum load capacity when a single wheel of Year Book 2008 version of JATMA is applied. Outside of Japan, the regular internal pressure is an air pressure corresponding to a maximum load (maximum load capacity) of a single wheel described in a standard described later, and the regular load is a maximum load (maximum load capacity) of a single wheel in an applicable size described in the standard described later. The standards are set by industrial standards that are valid in an area where the tire is produced or used. For example, in the United States, the standard is "The Tire and Rim Association Inc.'s Year Book", and in Europe, the standard is "The European Tire and Rim Technical Organization's Standards Manual".

Outer main grooves 21 and 22, inner main grooves 23 and 24, outer resonators 25, and inner resonators 26 are formed on the tread surface portion 11.

The outer main grooves 21 and 22 extend continuously in the tire circumferential direction. The two outer main grooves 21 and 22 are formed in an outer tread surface portion 11a of the tread surface portion 11 located on an outer side of the vehicle in the tire width direction with respect to a tire equator CL, and are spaced apart from each other in the tire width direction.

The inner main grooves 23 and 24 extend continuously in the tire circumferential direction. The two inner main grooves 23 and 24 are formed in an inner tread surface portion 11b of the tread surface portion 11 located on an inner side of the vehicle in the tire width direction with respect to the tire equator CL, and are spaced apart from each other in the tire width direction.

The groove width of the first outer main groove 21, which is located on the outer side in the tire width direction, of the two outer main grooves 21 and 22 is widest among the two outer main grooves 21 and 22 and the two inner main grooves 23 and 24. The total groove width of the two outer main grooves 21 and 22 is larger than the total groove width of the two inner main grooves 23 and 24.

The widths of the two outer main grooves 21, 22 and the two inner main grooves 23, 24 may be changed as appropriate, for example, they may be made equal to each other. Further, the total groove width of the two outer main grooves 21 and 22 may be less than or equal to the total groove width of the two inner main grooves 23 and 24.

A central land portion 27 is partitioned by the second outer main groove 22, which is located on the inner side in the tire width direction, of the two outer main grooves 21 and 22 and the second inner main groove 24, which is located on the inner side in the tire width direction, of the two inner main grooves 23 and 24, and extends continuously in the tire circumferential direction. A central portion of the central land portion 27 in the tire width direction is located on the tire equator CL. A plurality of first sipes S1, which are opened to the second inner main groove 24 and extend toward one side in the tire circumferential direction from the inner side of the vehicle toward the outer side of the vehicle, are formed in the central land portion 27 at intervals in the tire circumferential direction. The first sipes S1 intersect the tire equator CL.

Here, the "sipe" refers to a groove having a width such that a pair of side surfaces, which face each other, of inner surfaces of the groove at least partially come into contact with each other when the tire 1 touches the ground.

The plurality of outer resonators 25 are formed in an outer land portion 28, which is partitioned by the two outer main grooves 21 and 22, and arranged in the tire circumferential direction, and the plurality of inner resonators 26 are formed in an inner land portion 29, which is partitioned by the two inner main grooves 23 and 24, and arranged in the tire circumferential direction. The width of each of the outer land portion 28 and the inner land portion 29 is wider than the width of the central land portion 27.

The outer resonator 25 includes a first vertical groove 31 which extends in the tire circumferential direction, and a first branch groove 32 and a second branch groove 33 which have an inner volume smaller than that of the first vertical groove 31, extend in the tire width direction from both end portions of the first vertical groove 31 in the tire circumferential direction such that the first branch groove 32 and the second branch groove 33 extend in directions opposite to each other, and are opened to the two outer main grooves 21 and 22, respectively.

In the present embodiment, the first branch groove 32 and the second branch groove 33 are the sipes. The first branch groove 32 and the second branch groove 33 may be grooves in which a pair of side surfaces, which face each other, of inner surfaces of the groove do not come into contact with each other when the tire 1 touches the ground.

The first vertical groove 31 extends inward in the tire width direction from one side toward the other side in the tire circumferential direction. The width of the first vertical groove 31 is narrower than the width of the first outer main groove 21. As shown in FIG. 3, the depth of each of both end portions 31c of the first vertical groove 31 in the tire circumferential direction decreases toward the outer side in the tire circumferential direction.

The first vertical groove 31 includes a first portion 31a located on one side in the tire circumferential direction and a second portion 31b located on the other side in the tire circumferential direction. The lengths of the first portion 31a and the second portion 31b are equal to each other. The width of the first portion 31a is constant over the entire length in the tire circumferential direction. The width of the second portion 31b becomes narrower from one side toward the other side in the tire circumferential direction. One end portion of the second portion 31b in the tire circumferential direction, which is a connecting portion of the second portion 31b with the first portion 31a, protrudes outward in the tire width direction with respect to the first portion 31a. A protruding portion, of one end portion of the second portion 31b in the tire circumferential direction, protruding from the first portion 31a in the tire width direction extends toward the other side in the tire circumferential direction as it goes outward in the tire width direction. The other end portion of the second portion 31b in the tire circumferential direction has a width without an acute angle sharpened in the tire circumferential direction.

One end portion of the second portion 31b in the tire circumferential direction may protrude inward in the tire width direction with respect to the first portion 31a, or may protrude to both sides in the tire width direction. Further, the other end portion of the first portion 31a in the tire circumferential direction may protrude in the tire width direction with respect to the second portion 31b. Further, the protruding portion may be not formed on both the first portion 31a and the second portion 31b.

The first branch groove 32 extends from one end portion of the first portion 31a in the tire circumferential direction toward one side in the tire circumferential direction and toward the first outer main groove 21.

The second branch groove 33 extends from the other end portion of the second portion 31b in the tire circumferential direction toward the other side in the tire circumferential direction and toward the second outer main groove 22. The second branch groove 33 is located on the same straight line as the first sipe S1 of the central land portion 27. The inclination angle of the second branch groove 33 with respect to the tire width direction is smaller than the inclination angle of the first branch groove 32 with respect to the tire width direction.

As is described above, the first branch groove 32 and the second branch groove 33 extend, from the first vertical groove 31 toward the outer main grooves 21 and 22, in a direction away from the first vertical groove 31 in the tire circumferential direction. Further, all corner portions of an outer compartment land portion 34 defined by the two outer resonators 25 adjacent to each other in the tire circumferential direction have obtuse angles.

The two outer resonators 25 that are adjacent to each other in the tire circumferential direction are arranged so that end portions of the two outer resonators 25 in the tire circumferential direction are located at the same position in the tire circumferential direction and at different positions in the tire width direction. In the shown example, the second branch groove 33 and the end portion 31c of the first vertical groove 31 on the other side in the tire circumferential direction, of the outer resonator 25 located on one side in the tire circumferential direction, are located on the inner side in the tire width direction and at the same position in the tire circumferential direction with respect to the first branch groove 32 and the end portion 31c of the first vertical groove 31 on one side in the tire circumferential direction, of the outer resonator 25 located on the other side in the tire circumferential direction.

The outer compartment land portion 34 extends inward in the tire width direction from one side to the other side in the tire circumferential direction, and is constricted in the tire width direction at a central portion 34a thereof in the tire circumferential direction.

The inner resonator 26 includes a second vertical groove 36 which extends in the tire circumferential direction, and a third branch groove 37 and a fourth branch groove 38 which have an inner volume smaller than that of the second vertical groove 36, extend in the tire width direction from the second vertical groove 36 such that the third branch groove 37 and the fourth branch groove 38 extend in directions opposite to each other, and are opened to the two inner main grooves 23 and 24, respectively.

The third branch groove 37 and the fourth branch groove 38 are connected to both end portions of the second vertical groove 36 in the tire circumferential direction.

In the present embodiment, the third branch groove 37 and the fourth branch groove 38 are the sipes. The third branch groove 37 and the fourth branch groove 38 may be grooves in which a pair of side surfaces, which face each other, of inner surfaces of the groove do not come into contact with each other when the tire 1 touches the ground.

The second vertical groove 36 extends outward in the tire width direction from one side toward the other side in the tire circumferential direction. The width of the second vertical groove 36 is narrower than the width of the first outer main groove 21.

The second vertical groove 36 includes a third portion 36a located on one side in the tire circumferential direction and a fourth portion 36b located on the other side in the tire circumferential direction. The width of each of the third portion 36a and the fourth portion 36b become narrower from one side toward the other side in the tire circumferential direction. A connecting portion of the third portion 36a with the fourth portion 36b protrudes outward in the tire width direction with respect to the fourth portion 36b. The depth of the third portion 36a is shallower than the depth of the fourth portion 36b.

A connecting branch groove 36c extending from the other end portion of the fourth portion 36b in the tire circumferential direction toward the other side in the tire circumferential direction is formed in the inner land portion 29. The inner volume of the connecting branch groove 36c is smaller than the inner volume of the second vertical groove 36.

In the present embodiment, the connecting branch groove 36c is the sipe. The connecting branch groove 36c may be a groove in which a pair of side surfaces, which face each other, of inner surfaces of the groove do not come into contact with each other when the tire 1 touches the ground.

In the shown example, the inner resonator 26 includes a hidden groove 26a which is not opened to the tread surface portion 11 and protrudes outward in the tire width direction from a portion of the inner resonator 26 located on the inner side in the tire radial direction from the outer end portions of the fourth portion 36b and the connecting branch groove 36c in the tire radial direction. The inner resonator 26 having no hidden groove 26a may be adopted.

The third branch groove 37 extends from one end portion of the third portion 36a in the tire circumferential direction toward one side in the tire circumferential direction and toward the second inner main groove 24. The third branch groove 37 is substantially parallel to and close to the straight line passing through the first sipe S1 of the central land portion 27.

The fourth branch groove 38 extends from the other end portion of the connecting branch groove 36c in the tire circumferential direction toward the other side in the tire circumferential direction and toward the first inner main groove 23 of the two inner main grooves 23 and 24 located on the outer side in the tire width direction. The inclination angle of the fourth branch groove 38 with respect to the tire width direction is slightly larger than the inclination angle of the third branch groove 37 with respect to the tire width direction.

The fourth branch groove 38 may be directly connected to the other end portion of the fourth portion 36b in the tire circumferential direction without passing through the connecting branch groove 36c.

As is described above, the third branch groove 37 and the fourth branch groove 38 extend, from the second vertical groove 36 toward the outer main grooves 21 and 22, in a direction away from the second vertical groove 36 in the tire circumferential direction. Further, all corner portions of an inner compartment land portion 39 defined by the two inner resonators 26 adjacent to each other in the tire circumferential direction have obtuse angles.

The two inner resonators 26 that are adjacent to each other in the tire circumferential direction are arranged so that end portions of the two inner resonators 26 in the tire circumferential direction are located at the same position in the tire circumferential direction and at different positions in the tire width direction. In the shown example, the fourth branch groove 38 of the inner resonator 26 located on one side in the tire circumferential direction is located on the outer side in the tire width direction and at the same position in the tire circumferential direction with respect to the third branch groove 37 of the inner resonator 26 located on the other side in the tire circumferential direction.

The inner compartment land portion 39 extends outward in the tire width direction from one side to the other side in the tire circumferential direction, and is constricted in the tire width direction at a central portion 39a thereof in the tire circumferential direction.

The number of outer resonators 25 is larger than the number of inner resonators 26. The size of the outer resonator 25 in the tire circumferential direction is smaller than the size of the inner resonator 26 in the tire circumferential direction. In the shown example, in the tread surface portion 11, the entire one outer resonator 25 and parts of two outer resonators 25 adjacent to the one outer resonator 25 on both sides in the tire circumferential direction are located in a region in the circumferential direction in which one inner resonator 26 is located.

The number of outer resonators 25 may be less than or equal to the number of inner resonators 26, and the size of the outer resonator 25 in the tire circumferential direction may be greater than or equal to the size of the inner resonator 26 in the tire circumferential direction.

A plurality of second sipes S2 opened to the second inner main groove 24 are formed in an inner end portion of the inner land portion 29 in the tire width direction at intervals in the tire circumferential direction. The second sipe S2 is parallel to the third branch groove 37. The second sipe S2 is located on the same straight line as the first sipe S1 of the central land portion 27. The length of the second sipe S2 is shorter than that of the third branch groove 37.

A plurality of third sipes S3 opened to the first inner main groove 23 are formed in an outer end portion of the inner land portion 29 in the tire width direction at intervals in the tire circumferential direction. The third sipe S3 is parallel to the fourth branch groove 38. The length of the third sipe S3 is shorter than that of the fourth branch groove 38. The positions of the third sipe S3 and the second sipe S2 in the tire circumferential direction are different from each other.

The third sipe S3 and the second sipe S2 are located at different positions in the tire width direction and at the same position in the tire circumferential direction with respect to the second vertical groove 36 of the inner resonator 26. The distance between the second sipe S2 and the second vertical groove 36 in the tire width direction is longer than the distance between the third sipe S3 and the second vertical groove 36 in the tire width direction.

The second sipe S2 is formed in a first portion of the inner compartment land portion 39 located on one side in the tire circumferential direction from the central portion 39a in the tire circumferential direction constricted in the tire width direction and is located at a central portion of the first portion in the tire circumferential direction, and the third sipe S3 is formed in a second portion of the inner compartment land portion 39 located on the other side in the tire circumferential direction from the central portion 39a in the tire circumferential direction and is located at a central portion of the second portion in the tire circumferential direction.

In the tread surface portion 11, an outer shoulder land portion 41 is provided between the first outer main groove 21 and an outer end edge OE of the tread surface portion 11 on the outer side of the vehicle along the tire width direction, and a plurality of fourth sipes S4, which extend from the first outer main groove 21 to the outer end edge OE on the outer side of the vehicle, are formed in the outer shoulder land portion 41 at intervals in the tire circumferential direction. A fifth sipe S5 which extends in the tire circumferential direction is formed in the outer shoulder land portion 41 such that the fifth sipe S5 extends continuously over the entire circumference and intersects the fourth sipes S4. A plurality of sixth sipe S6, which extend from a portion of the outer shoulder land portion 41 on the outer side in the tire width direction from the fifth sipe S5 to the buttress portion 12 on the outer side of the vehicle beyond the outer end edge OE on the outer side of the vehicle, are formed at intervals in the tire circumferential direction. The sixth sipes S6 are located between the fourth sipes S4 adjacent to each other in the tire circumferential direction.

In the tread surface portion 11, an inner shoulder land portion 42 is provided between the first inner main groove 23 and an inner end edge IE of the tread surface portion 11 on the inner side of the vehicle along the tire width direction, and a plurality of seventh sipes S7, which extend from the first inner main groove 23 to the inner end edge IE on the inner side of the vehicle, are formed in the inner shoulder land portion 42 at intervals in the tire circumferential direction. The seventh sipes S7 extend beyond the inner end edge IE on the inner side of the vehicle to the buttress portion 12 on the inner side of the vehicle. An eighth sipe S8 which extends in the tire circumferential direction is formed in the inner shoulder land portion 42 such that the eighth sipe S8 extends continuously over the entire circumference and intersects the seventh sipes S7.

A plurality of ninth sipes S9, which extend from the eighth sipe S8 toward the outer side in the tire width direction and reach the inner end edge IE on the inner side of the vehicle, are formed in the inner shoulder land portion 42 at intervals in the tire circumferential direction. The ninth sipes S9 extend beyond the inner end edge IE on the inner side of the vehicle to the buttress portion 12 on the inner side of the vehicle. The ninth sipes S9 are located between the seventh sipes S7 adjacent to each other in the tire circumferential direction.

As described above, according to the tire 1 according to the present embodiment, the plurality of outer resonators 25 are formed in the outer land portion 28 and arranged in the tire circumferential direction, and the plurality of inner resonators 26 are formed in the inner land portion 29 and arranged in the tire circumferential direction. Therefore, during traveling, a portion of air flowing between the road surface and the outer main grooves 21 and 22 and the inner main grooves 23 and 24 is introduced into the first vertical groove 31 and the second vertical groove 36 through the first branch groove 32 or the second branch groove 33 and the third branch groove 37 or the fourth branch groove 38, and thus, it is possible to attenuate vibrations of the air flowing between the road surface and the outer main grooves 21 and 22 and the inner main grooves 23 and 24, and it is possible to suppress occurrence of air column resonance.

The central land portion 27 partitioned by the second outer main groove 22 and the second inner main groove 24 adjacent to each other in the tire width direction extends continuously in the tire circumferential direction. Accordingly, when traveling straight, it is possible to ensure a ground contact area near the tire equator CL having the longest contact length in the tread surface portion 11, and it is possible to prevent deterioration of steering stability due to the formation of the outer resonator 25 and the inner resonator 26 in the tread surface portion 11.

Since the first branch groove 32 and the second branch groove 33 of the outer resonator 25 extend in the tire width direction from both end portions 31c of the first vertical groove 31 in the tire circumferential direction such that the first branch groove 32 and the second branch groove 33 extend in directions opposite to each other, the size of the outer compartment land portion 34 in the tire circumferential direction, which is partitioned by the two outer resonators 25 adjacent to each other in the tire circumferential direction, is the same as the entire length of the two outer resonators 25 in the tire circumferential direction. As a result, the length of the outer compartment land portion 34 in the tire circumferential direction is ensured to be long, it is possible to ensure the rigidity of the entire outer land portion 28 partitioned by the two outer main grooves 21 and 22, and it is possible to reduce a contact pressure, during turning, generated on the outer tread surface portion 11a of the tire 1 located on the turning outer side among the tires 1 of the front wheels.

Since the outer resonator 25 includes the first branch groove 32 and the second branch groove 33, the two outer compartment land portions 34 adjacent to each other in the tire circumferential direction are arranged so that at least end portions of the two outer compartment land portions 34 in the tire circumferential direction are located at the same position in the tire circumferential direction and at different positions in the tire width direction. Therefore, during turning, the outer compartment land portions 34 can be supported by each other in both the tire width direction and the tire circumferential direction, and the rigidity of the outer compartment land portion 34 can be increased.

From the above, it is possible to ensure steering stability during turning.

Since the number of outer resonators 25 is larger than the number of inner resonators 26, when the tire touches the ground, it is possible to make it easier to position the outer resonator 25 on the road surface as compared with the inner resonator 26. As a result, it is possible to reliably suppress the occurrence of the air column resonance generated in the outer main grooves 21 and 22, which contributes more to a passing noise during traveling than the air column resonance generated in the inner main grooves 23 and 24, and thus, the passing noise can be effectively reduced.

Since the size of the outer resonator 25 in the tire circumferential direction is smaller than the size of the inner resonator 26 in the tire circumferential direction, when the tire touches the ground, it is possible to make it easier to position the outer resonator 25 on the road surface as compared with the inner resonator 26. As a result, it is possible to reliably suppress the occurrence of the air column resonance generated in the outer main grooves 21 and 22, which contributes more to a passing noise during traveling than the air column resonance generated in the inner main grooves 23 and 24, and thus, the passing noise can be effectively reduced.

Since the first branch groove 32 and the second branch groove 33 extend, from the first vertical groove 31 toward the outer main grooves 21 and 22, in the direction away from the first vertical groove 31 in the tire circumferential direction, all corner portions of the outer compartment land portion 34, which is partitioned by the two outer resonators 25 adjacent to each other in the tire circumferential direction, have obtuse angles. Therefore, it is possible to prevent occurrence of an excessively large contact pressure which is locally applied to the outer compartment land portion 34 when the tire touches the ground, and it is possible to suppress uneven wear of the outer compartment land portion 34.

Since the first branch groove 32 and the second branch groove 33 extend, from the first vertical groove 31 toward the outer main grooves 21 and 22, in the direction away from the first vertical groove 31 in the tire circumferential direction, in a process in which water on the road surface flows from one of the two outer main grooves 21 and 22 toward the other, the water flows in the same direction in the tire circumferential direction, and thus, drainage performance can be ensured.

Since the groove width of the first outer main groove 21 of the two outer main grooves 21 and 22 located on the outer side in the tire width direction is widest among the two outer main grooves 21 and 22 and the two inner main grooves 23 and 24, during turning, it is possible to generate a large contact pressure at an opening peripheral edge portion of the first outer main groove 21 in the outer tread surface portion 11a of the tire 1 located on the turning outer side among the tires 1 of the front wheels, it is possible to exert an edge effect on the road surface, and thus it is possible to reliably ensure steering stability during turning.

Further, since the total groove width of the two outer main grooves 21 and 22 is larger than the total groove width of the two inner main grooves 23 and 24, during turning, it is possible to exert the edge effect on the road surface over a wide range of the outer tread surface portion 11a.

Since any one of the first portion 31a and the second portion 31b of the first vertical groove 31 protrudes in the tire width direction with respect to the other, it is possible to provide many corner portions on the outer compartment land portion 34, it is possible to enhance the edge effect exerted on the road surface by the outer compartment land portion 34, and steering stability can be reliably ensured during turning.

The technical scope of the present invention is not limited to the above-mentioned embodiment and can be variously modified without departing from the scope of the present invention.

In the above embodiment, although the third branch groove 37 and the fourth branch groove 38 are each connected to both end portions of the second vertical groove 36 in the tire circumferential direction, the present invention is not limited to this, and for example, the third branch groove 37 and the fourth branch groove 38 may be connected to an intermediate portion of the second vertical groove 36 in the tire circumferential direction.

The first branch groove 32 and the second branch groove 33 may extend such that the distance between the first vertical groove 31 and the first branch groove 32 and the second branch groove 33 in the tire circumferential direction decreases from the first vertical groove 31 toward the outer main grooves 21 and 22, or may extend straight in the tire width direction.

The outer resonator 25 and the inner resonator 26 are not limited to the above-described embodiment, and may be appropriately changed.

Moreover, the components of the above-described embodiment can be appropriately substituted with well-known components without departing from the scope of the present invention, and the above-described embodiments and modification examples may be appropriately combined with each other.

In the present invention, the plurality of outer resonators are formed in the outer land portion and arranged in the tire circumferential direction, and the plurality of inner resonators are formed in the inner land portion and arranged in the tire circumferential direction. Therefore, during traveling, a portion of air flowing between the road surface and the outer main grooves and the inner main grooves is introduced into the first vertical groove and the second vertical groove through the first branch groove or the second branch groove and the third branch groove or the fourth branch groove, and thus, it is possible to attenuate vibrations of the air flowing between the road surface and the outer main grooves and the inner main grooves, and it is possible to suppress occurrence of air column resonance.

Since the central land portion partitioned by the outer main groove and the inner main groove adjacent to each other in the tire width direction extends continuously in the tire circumferential direction, when traveling straight, it is possible to ensure a ground contact area near the tire equator having the longest contact length in the tread surface portion, and it is possible to prevent deterioration of steering stability due to the formation of the outer resonator and the inner resonator in the tread surface portion.

Since the first branch groove and the second branch groove of the outer resonator extend in the tire width direction from both end portions of the first vertical groove in the tire circumferential direction such that the first branch groove and the second branch groove extend in directions opposite to each other, the size of the outer compartment land portion in the tire circumferential direction, which is partitioned by the two outer resonators adjacent to each other in the tire circumferential direction, is the same as the entire length of the two outer resonators in the tire circumferential direction. As a result, the length of the outer compartment land portion in the tire circumferential direction is ensured to be long, it is possible to ensure the rigidity of the entire outer land portion partitioned by the two outer main grooves, and it is possible to reduce a contact pressure, during turning, generated on the outer tread surface portion of the tire located on the turning outer side among the tires of the front wheels.

Since the outer resonator includes the first branch groove and the second branch groove, the two outer compartment land portions adjacent to each other in the tire circumferential direction are arranged so that at least end portions of the two outer compartment land portions in the tire circumferential direction are located at the same position in the tire circumferential direction and at different positions in the tire width direction. Therefore, during turning, the outer compartment land portions can be supported by each other in both the tire width direction and the tire circumferential direction, and the rigidity of the outer compartment land portion can be increased.

From the above, it is possible to ensure steering stability during turning.

Here, the number of the outer resonators may be larger than the number of the inner resonators.

In this case, since the number of outer resonators is larger than the number of inner resonators, when the tire touches the ground, it is possible to make it easier to position the outer resonator on the road surface as compared with the inner resonator. As a result, it is possible to reliably suppress the occurrence of the air column resonance generated in the outer main grooves, which contributes more to a passing noise during traveling than the air column resonance generated in the inner main grooves, and thus, the passing noise can be effectively reduced.

Further, the size of the outer resonator in the tire circumferential direction may be smaller than the size of the inner resonator in the tire circumferential direction.

In this case, since the size of the outer resonator in the tire circumferential direction is smaller than the size of the inner resonator in the tire circumferential direction, when the tire touches the ground, it is possible to make it easier to position the outer resonator on the road surface as compared with the inner resonator. As a result, it is possible to reliably suppress the occurrence of the air column resonance generated in the outer main grooves, which contributes more to a passing noise during traveling than the air column resonance generated in the inner main grooves, and thus, the passing noise can be effectively reduced.

Further, the first branch groove and the second branch groove may extend, from the first vertical groove toward the outer main grooves, in the direction away from the first vertical groove in the tire circumferential direction.

In this case, since the first branch groove and the second branch groove extend, from the first vertical groove toward the outer main grooves, in the direction away from the first vertical groove in the tire circumferential direction, all corner portions of the outer compartment land portion, which is partitioned by the two outer resonators adjacent to each other in the tire circumferential direction, have obtuse angles. Therefore, it is possible to prevent occurrence of an excessively large contact pressure which is locally applied to the outer compartment land portion when the tire touches the ground, and it is possible to suppress uneven wear of the outer compartment land portion.

Since the first branch groove and the second branch groove extend, from the first vertical groove toward the outer main grooves, in the direction away from the first vertical groove in the tire circumferential direction, in a process in which water on the road surface flows from one of the two outer main grooves toward the other, the water flows in the same direction in the tire circumferential direction, and thus, drainage performance can be ensured.

Further, the groove width of the first outer main groove of the two outer main grooves located on the outer side in the tire width direction may be widest among the two outer main grooves and the two inner main grooves.

In this case, since the groove width of the first outer main groove of the two outer main grooves located on the outer side in the tire width direction is widest among the two outer main grooves and the two inner main grooves, during turning, it is possible to generate a large contact pressure at the opening peripheral edge portion of the first outer main groove in the outer tread surface portion of the tire located on the turning outer side among the tires of the front wheels, it is possible to exert an edge effect on the road surface, and thus it is possible to reliably ensure steering stability during turning.

In this configuration, when the total groove width of the two outer main grooves is larger than the total groove width of the two inner main grooves, during turning, it is possible to exert the edge effect on the road surface over a wide range of the outer tread surface portion.

Further, the first vertical groove may include the first portion located on one side in the tire circumferential direction and the second portion located on the other side in the tire circumferential direction, and any one of the first portion and the second portion may protrude in the tire width direction with respect to the other In this case, since any one of the first portion and the second portion of the first vertical groove protrudes in the tire width direction with respect to the other, it is possible to provide many corner portions on the outer compartment land portion, it is possible to enhance the edge effect exerted on the road surface by the outer compartment land portion, and steering stability can be reliably ensured during turning.

INDUSTRIAL APPLICABILITY

By applying the tire of the present application to a relevant field, it is possible to improve steering stability during turning.

REFERENCE SIGNS LIST

1: Tire
11: Tread surface portion
11a: Outer tread surface portion
11b: Inner tread surface portion
21: First outer main groove (outer main groove)
22: Second outer main groove (outer main groove)
23: First inner main groove (inner main groove)
24: Second inner main groove (inner main groove)
25: Outer resonator
26: Inner resonator
27: Central land portion
28: Outer land portion
29: Inner land portion
31: First vertical groove
31a: First portion
31b: Second portion
32: First branch groove
33: Second branch groove
36: Second vertical groove
37: Third branch groove
38: Fourth branch groove
CL: Tire equator

The invention claimed is:

1. A tire comprising a tread portion which is located at an outer end portion in a tire radial direction and includes a tread surface portion facing an outer side in the tire radial direction,
wherein two outer main grooves extending continuously in a tire circumferential direction are formed in an outer tread surface portion of the tread surface portion located on an outer side of a vehicle in a tire width direction with respect to a tire equator,
two inner main grooves extending continuously in the tire circumferential direction are formed in an inner tread surface portion of the tread surface portion located on an inner side of the vehicle in the tire width direction with respect to the tire equator,
a central land portion partitioned by the outer main groove and the inner main groove adjacent to each other in the tire width direction extends continuously in the tire circumferential direction,
a plurality of outer resonators are formed in an outer land portion, which is partitioned by the two outer main grooves, and arranged in the tire circumferential direction, and a plurality of inner resonators are formed in an inner land portion, which is partitioned by the two inner main grooves, and arranged in the tire circumferential direction,
each outer resonator includes
a first vertical groove which extends in the tire circumferential direction, and
a first branch groove and a second branch groove which have an inner volume smaller than that of the first vertical groove, extend in the tire width direction from both end portions of the first vertical groove in the tire circumferential direction such that the first branch groove and the second branch groove extend in directions opposite to each other, and are respectively opened to the two outer main grooves,
each inner resonator includes
a second vertical groove which extends in the tire circumferential direction, and
a third branch groove and a fourth branch groove which have an inner volume smaller than that of the second vertical groove, extend in the tire width direction from the second vertical groove such that the third branch groove and the fourth branch groove extend in directions opposite to each other, and are respectively opened to the two inner main grooves,
two end portions of the first vertical groove in the tire circumferential direction have widths,
the first vertical groove includes a first portion located on one side in the tire circumferential direction and a second portion located on another side in the tire circumferential direction,
a width of the first portion is constant on an entire length of the first portion in the tire circumferential direction,
a width of the second portion becomes narrower from the one side toward the other side in the tire circumferential direction, and
a connecting portion of the second portion with the first portion protrudes outward in the tire width direction with respect to the first portion.

2. The tire according to claim 1, wherein the number of the outer resonators is larger than the number of the inner resonators.

3. The tire according to claim 2, wherein a size of each outer resonator in the tire circumferential direction is smaller than a size of each inner resonator in the tire circumferential direction.

4. The tire according to claim 3, wherein the first branch groove and the second branch groove extend, from the first vertical groove toward the outer main grooves, in a direction away from the first vertical groove in the tire circumferential direction.

5. The tire according to claim 3, wherein a groove width of a first outer main groove, of the two outer main grooves, located on an outer side in the tire width direction is widest among the two outer main grooves and the two inner main grooves.

6. The tire according to claim 3, wherein the first vertical groove includes a first portion located on one side in the tire circumferential direction and a second portion located on the other side in the tire circumferential direction, and
any one of the first portion and the second portion protrudes in the tire width direction with respect to the other.

7. The tire according to claim 2, wherein the first branch groove and the second branch groove extend, from the first vertical groove toward the outer main grooves, in a direction away from the first vertical groove in the tire circumferential direction.

8. The tire according to claim 7, wherein a groove width of a first outer main groove, of the two outer main grooves, located on an outer side in the tire width direction is widest among the two outer main grooves and the two inner main grooves.

9. The tire according to claim 2, wherein a groove width of a first outer main groove, of the two outer main grooves, located on an outer side in the tire width direction is widest among the two outer main grooves and the two inner main grooves.

10. The tire according to claim 2,
wherein the first vertical groove includes a first portion located on one side in the tire circumferential direction and a second portion located on the other side in the tire circumferential direction, and
any one of the first portion and the second portion protrudes in the tire width direction with respect to the other.

11. The tire according to claim 1,
wherein a size of each outer resonator in the tire circumferential direction is smaller than a size of each inner resonator in the tire circumferential direction.

12. The tire according to claim 11,
wherein the first branch groove and the second branch groove extend, from the first vertical groove toward the outer main grooves, in a direction away from the first vertical groove in the tire circumferential direction.

13. The tire according to claim 11,
wherein a groove width of a first outer main groove, of the two outer main grooves, located on an outer side in the tire width direction is widest among the two outer main grooves and the two inner main grooves.

14. The tire according to claim 11,
wherein the first vertical groove includes a first portion located on one side in the tire circumferential direction and a second portion located on the other side in the tire circumferential direction, and
any one of the first portion and the second portion protrudes in the tire width direction with respect to the other.

15. The tire according to claim 1,
wherein the first branch groove and the second branch groove extend, from the first vertical groove toward the outer main grooves, in a direction away from the first vertical groove in the tire circumferential direction.

16. The tire according to claim 15,
wherein a groove width of a first outer main groove, of the two outer main grooves, located on an outer side in the tire width direction is widest among the two outer main grooves and the two inner main grooves.

17. The tire according to claim 15,
wherein the first vertical groove includes a first portion located on one side in the tire circumferential direction and a second portion located on the other side in the tire circumferential direction, and
any one of the first portion and the second portion protrudes in the tire width direction with respect to the other.

18. The tire according to claim 1,
wherein a groove width of a first outer main groove, of the two outer main grooves, located on an outer side in the tire width direction is widest among the two outer main grooves and the two inner main grooves.

19. The tire according to claim 18,
wherein the first vertical groove includes a first portion located on one side in the tire circumferential direction and a second portion located on the other side in the tire circumferential direction, and
any one of the first portion and the second portion protrudes in the tire width direction with respect to the other.

20. The tire according to claim 1,
wherein the first vertical groove includes a first portion located on one side in the tire circumferential direction and a second portion located on the other side in the tire circumferential direction, and
any one of the first portion and the second portion protrudes in the tire width direction with respect to the other.

* * * * *